(12) United States Patent
Brady et al.

(10) Patent No.: US 12,036,752 B2
(45) Date of Patent: Jul. 16, 2024

(54) SURFACE FEATURE TRANSFER MEDIA AND METHODS OF USE

(71) Applicant: SRAM, LLC, Chicago, IL (US)

(72) Inventors: Patrick Brady, Chicago, IL (US); Michael Hall, Indianapolis, IN (US); Ruan Trouw, Mooresville, IN (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 18/078,241

(22) Filed: Dec. 9, 2022

(65) Prior Publication Data

US 2023/0104963 A1    Apr. 6, 2023

Related U.S. Application Data

(63) Continuation of application No. 15/342,784, filed on Nov. 3, 2016, now Pat. No. 11,571,862.

(51) Int. Cl.
*B29C 33/60* (2006.01)
*B29C 33/38* (2006.01)
*B29C 33/42* (2006.01)
*B29C 35/08* (2006.01)
(Continued)

(52) U.S. Cl.
CPC .......... *B29C 70/16* (2013.01); *B29C 33/3842* (2013.01); *B29C 33/424* (2013.01); *B29C 33/60* (2013.01); *B29C 35/0805* (2013.01); *B29C 35/0866* (2013.01); *B29C 59/005* (2013.01); *B29C 59/026* (2013.01); *B29C 64/112* (2017.08); *B29C 70/46* (2013.01); *B41M 5/00* (2013.01); *B60B 5/02* (2013.01);
(Continued)

(58) Field of Classification Search
None
See application file for complete search history.

(56) References Cited

U.S. PATENT DOCUMENTS

| 5,756,182 A | 5/1998 | Kutsch et al. |
| 6,355,343 B1 * | 3/2002 | Glassock ............... B29C 33/68 249/115 |

(Continued)

FOREIGN PATENT DOCUMENTS

| CN | 1671559 | 9/2005 |
| CN | 1703326 | 11/2005 |

(Continued)

OTHER PUBLICATIONS

Sappi Global, Ultracast—The ulitmate release paper, https://www.sappi.com/ultracast, accessed Jan. 20, 2023, 6 pages.

*Primary Examiner* — Mohammad M Ameen (57) ABSTRACT

Forming features in the surface of a bicycle component involves depositing a substance onto a substrate in a geometric pattern to form a transfer medium. Forming features may also involve positioning the transfer medium relative to an unformed bicycle component, and forming a negative of the geometric pattern in the bicycle component through the application of heat and/or pressure to the transfer medium and the unformed bicycle component. The transfer medium may be configured for use in the molding of carbon fiber reinforced plastic ("CFRP") bicycle components and may include a substrate formed of a flexible material, and a geometric pattern formed of a hard material, the hard material different than the flexible material.

11 Claims, 12 Drawing Sheets

(51) Int. Cl.
- *B29C 59/00* (2006.01)
- *B29C 59/02* (2006.01)
- *B29C 64/112* (2017.01)
- *B29C 70/16* (2006.01)
- *B29C 70/46* (2006.01)
- *B41M 5/00* (2006.01)
- *B60B 5/02* (2006.01)
- *B60B 7/00* (2006.01)
- B29K 63/00 (2006.01)
- B29K 105/06 (2006.01)
- B29K 307/04 (2006.01)
- B29L 31/30 (2006.01)

(52) U.S. Cl.
CPC .... *B60B 7/0033* (2013.01); *B29C 2035/0822* (2013.01); *B29C 2035/0827* (2013.01); *B29C 2035/0877* (2013.01); *B29K 2063/00* (2013.01); *B29K 2105/06* (2013.01); *B29K 2307/04* (2013.01); *B29K 2995/0037* (2013.01); *B29L 2031/3091* (2013.01)

(56) References Cited

U.S. PATENT DOCUMENTS

| | | |
|---|---|---|
| 7,114,785 B2 | 10/2006 | Ording et al. |
| 2002/0076500 A1 | 6/2002 | Glassock |
| 2002/0180097 A1 | 12/2002 | Giachetto et al. |
| 2005/0212184 A1 | 9/2005 | Filzmoser |
| 2008/0272572 A1 | 11/2008 | Tsai |
| 2009/0194502 A1* | 8/2009 | Houle ............... B29C 35/0888 264/494 |
| 2014/0265538 A1* | 9/2014 | Brady ............... B60B 7/0006 301/95.101 |
| 2016/0144433 A1 | 5/2016 | Stoffel |
| 2016/0318258 A1* | 11/2016 | Valade ............... H04N 1/54 |
| 2016/0332341 A1 | 11/2016 | Iwase et al. |
| 2017/0165899 A1 | 6/2017 | Murray |

FOREIGN PATENT DOCUMENTS

| | | |
|---|---|---|
| CN | 1332808 | 8/2007 |
| CN | 102205755 | 10/2011 |
| CN | 103372975 | 10/2013 |
| CN | 104070924 | 10/2014 |
| EP | 2896511 | 7/2015 |
| FR | 2207812 | 6/1974 |
| TW | 200743590 | 12/2007 |
| TW | 201103740 | 2/2011 |
| TW | 201338960 | 10/2013 |
| TW | 201441066 | 11/2014 |
| WO | 2014202041 A1 | 12/2014 |

\* cited by examiner

SURFACE FEATURE TRANSFER MEDIA AND METHODS OF USE

This application claims priority to, and/or the benefit of, U.S. patent application Ser. No. 15/342,784, filed on Nov. 3, 2016.

BACKGROUND OF THE INVENTION

Surface feature creation, for example small structure geometric features, engravings, or other structures, have been employed in permanent tool casting and molding for many years. This structuring of features, patterns, and fine surface topology has been most successful with molding materials filled in a mold cavity under high mold pressure and temperature. Further, features with a high draft angle are typically made to allow for a cast or molded part to shrink and detach from the mold surface without interlocking with the features in the mold.

Many cast or molded materials, particularly epoxide resins used in thermosetting reaction type carbon fiber reinforced plastics, however, do not have desirable self-releasing properties, but instead adhere to active metals and other material surfaces with a high surface energy. These resins bond to the surfaces of the mold cavity materials. While it is desirable for the epoxide resin to wet and bond sufficiently to the carbon fiber reinforcements of the composite, it is not desirable for the epoxide resin to bond to the mold cavity surface.

A common practice for molding difficult high bonding resins is to employ a liquid mold release which is applied as a sprayed, wiped, or brushed thin film onto a clean mold surface, and cured to form a low-energy temporary low-bond (i.e. non-stick) surface. The mold release coatings have a short lifespan and decay each time a part is made in a molding process cycle. Eventually, the mold release coating properties are degraded and the material oxidizes to a point where it becomes a contaminant and therefore must be stripped from the mold surface by chemical and/or mechanical techniques, then reapplied.

Removing the oxidized release material can be difficult, especially in sharply formed fine transition areas around features formed into the mold. These fine features are difficult to clean using existing methods.

Further, the fine mold features themselves are an expensive component of tool construction. The precision machining required for the creation of the mold features is time consuming and difficult, even when performed by computer controlled machining and/or other material removal practices.

SUMMARY

In an embodiment, a method of forming features in the surface of a bicycle component involves depositing a substance onto a substrate in a geometric pattern to form a transfer medium. The method also involves positioning the transfer medium relative to an unformed bicycle component, and forming a negative of the geometric pattern in the bicycle component through the application of heat and/or pressure to the transfer medium and the unformed bicycle component.

In an embodiment, a transfer medium for use in the molding of carbon fiber reinforced plastic ("CFRP") bicycle components includes a substrate formed of a flexible material, and a geometric pattern formed of a hard material, the hard material different than the flexible material.

BRIEF DESCRIPTION OF THE DRAWINGS

Other aspects and advantages of the embodiments disclosed herein will become apparent upon consideration of the following detailed description, wherein similar or identical structures have similar or identical reference numerals.

DETAILED DESCRIPTION

Surface features may be created in the manufacture of bicycle components through the use of a transfer media that provides for the creation of surface features in the component and/or a resistance to adhesion of the formed component to the mold. The transfer medium may be created to include precise three dimensional ("3D") geometry features, for example through the deposition of a material consisting of monomers, oligomers, and a catalyzing agent onto a flexible substrate. The deposited material may be hardened through a curing process. The transfer medium may then be placed in contact with an unformed component and impart a surface feature onto a formed component during the formation of the component, for example a molded carbon fiber reinforced plastic part. The surface feature may include detailed complex geometrical features. In an embodiment, the transfer medium with cured material forming a geometric patterned shape is positioned in a mold with materials of an unformed bicycle component. Through the process of applying heat and pressure to cure the unfinished materials a surface feature representing the geometric patterned shape is formed in the finished component.

In an embodiment, jet material deposition processes, such as ink-jet printing processes, may be used to deposit the material onto the substrate to form the geometric patterned shape. This technique allows for a nearly unlimited flexibility to generate various patterns of shape features at a rapid pace and relative low cost. The use of jet material deposition allows for the creation of a transfer medium having detailed complex geometrical features, and also for a rapid and inexpensive alternative to permanent tool generation, manipulation, and/or maintenance.

In an embodiment, a transfer media is created. Creating the transfer media involves the deposition of at least one film layer of heat resistant resin in a controlled manner onto a flexible thin sheet material, or substrate, to create a desired feature shape and/or plurality of shapes. The shapes may include shapes having a variable thickness beyond the substrate relative to other shapes. The substrate sheet may be cut into a shape which fits precisely into a mold cavity, covering the mold surface, and thereby creating the mold surface features which are to be transferred to the outer wall of a molded part surface. For example, the substrate may be cut in a circular shape for bicycle rim molding. Uncured epoxy and fiber material is placed into the mold. The mold tool is closed, and heat and pressure are applied to cure the fiber reinforced epoxy structure. After a period of time, for example 30 minutes to two ("2") hours of cure time, the cured part is removed from the mold, the transfer medium is peeled from the part. The part may subsequently undergo further processing, such as a removal of excess resin and machining of spoke holes, to become a complete bicycle rim.

In an embodiment, a transfer medium for use in the molding of carbon fiber reinforced plastic ("CFRP") bicycle components includes a substrate formed of a flexible material, and a geometric pattern formed of a hard material, the hard material different than the flexible material. For example, the hard material may be a cured resin and the flexible material may be a thin sheet or film of fabric, paper, or plastic. The transfer medium may also include a release surface formed of a release material having a low surface energy causing poor adhesion to the CFRP materials of the bicycle component. The release material may be different than the hard material. Also, the release material may be in contact with the flexible material of the substrate and/or the hard material of the geometric pattern.

Figure 1:
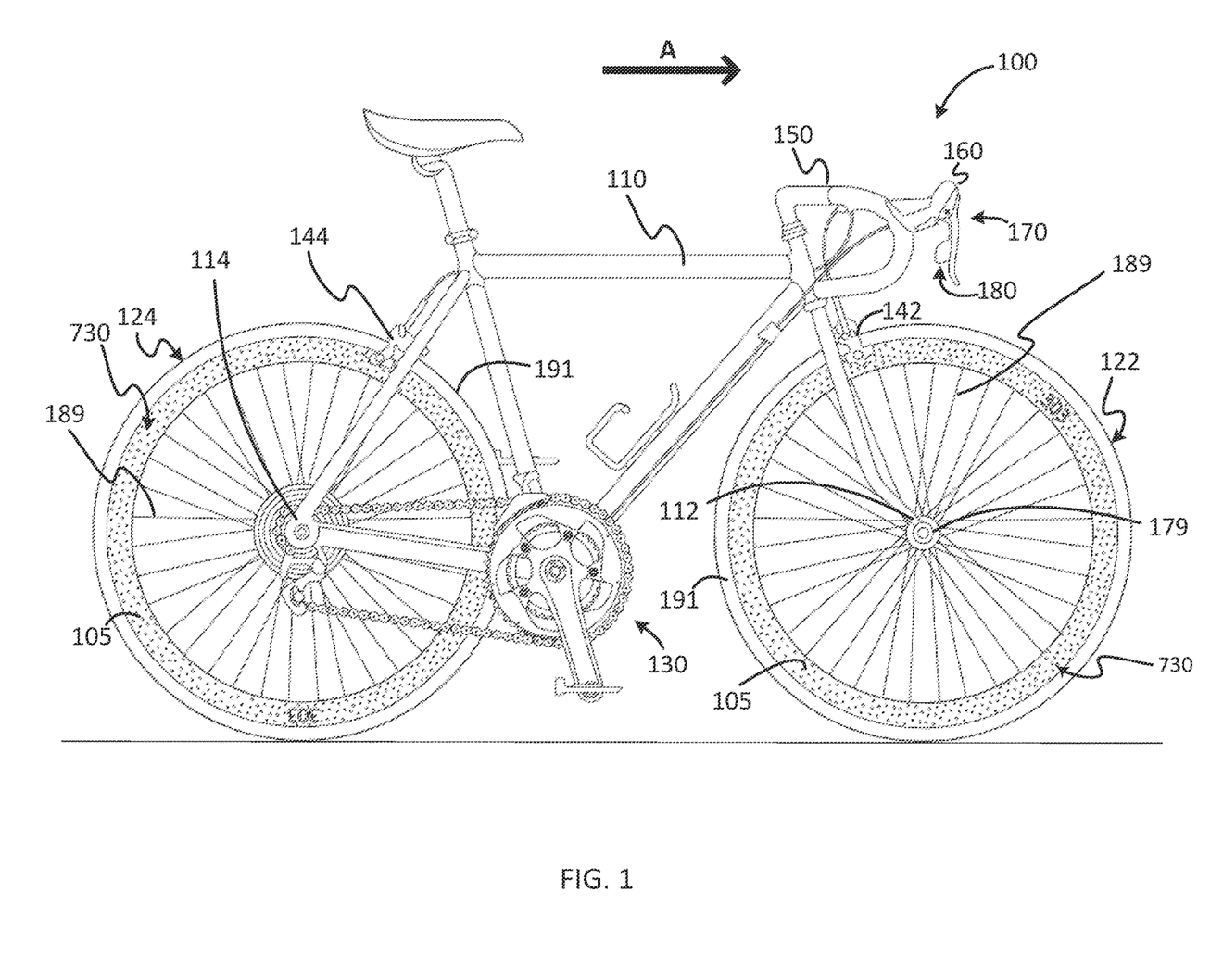
FIG. 1 is a side view of a bicycle, which may be used to employ a component having surface features created with a transfer medium.

FIG. 1 generally illustrates a bicycle 100 with which components, such as bicycle wheels 122, 124 having a rim 105, that include surface features 730 formed through the use of a transfer medium as described herein. The bicycle 100 includes a frame 110, front and rear wheels 122, 124 rotatably attached to the frame 110, and a drivetrain 130. The frame 110 includes wheel mounting portions 112, 114 to attach the front wheel 122 and the rear wheel 124, respectively.

A front brake 142 is provided for braking the front wheel 122, and a rear brake 144 is provided for braking the rear wheel 124. The front and/or forward orientation of the bicycle 100 is indicated by the direction of arrow "A." As such, a forward direction of movement for the bicycle is indicated by the direction of arrow A.

While the illustrated bicycle 100 is a road bike having drop-style handlebars 150, the present invention has applications to bicycles of any type, including fully or partially suspensioned mountain bikes and others, as well as bicycles with mechanically controlled (e.g. cable, hydraulic, pneumatic) and non-mechanical controlled (e.g. wired, wireless) drive systems.

The bicycle 100 may include one or more bicycle control devices 160, mounted to handlebars 150. The bicycle control devices 160 may include one or more types of bicycle control and/or actuation systems. For example, the bicycle control devices 160 may include brake actuation systems 170 to control the front and/or rear brakes 142, 144, and/or gear shifting systems 180 to control the drivetrain 130. Other control systems may also be included. For example, the system may be applied, in some embodiments, to a bicycle where only a front or only a rear gear changer is used. Also, the one or more bicycle control devices 160 may also include suspension and/or other control systems for the bicycle 100.

As can be seen in FIG. 1, the front and/or rear wheel 122, 124 of the bicycle 100 may include a tire 191, attached to a radially outer tire engaging portion of a rim 105. A plurality of spokes 189 are attached directly to the rim 105. Alternatively, the spokes 189 may be attached and/or secured to the rim 105 with other structural components. The spokes 189 extend from the rim 105 and attach to a central hub 179. The spokes 189 are maintained with a tension between the rim 105 and the hub 179 to provide the wheel 122, 124 with an operational rigidity for use on the bicycle 100. The hub 179 is configured for rotational attachment to the bicycle frame 110. The rim 105 of the wheel 122, 124 may include one or more surface features 730 formed in the rim 105.

Figure 2:
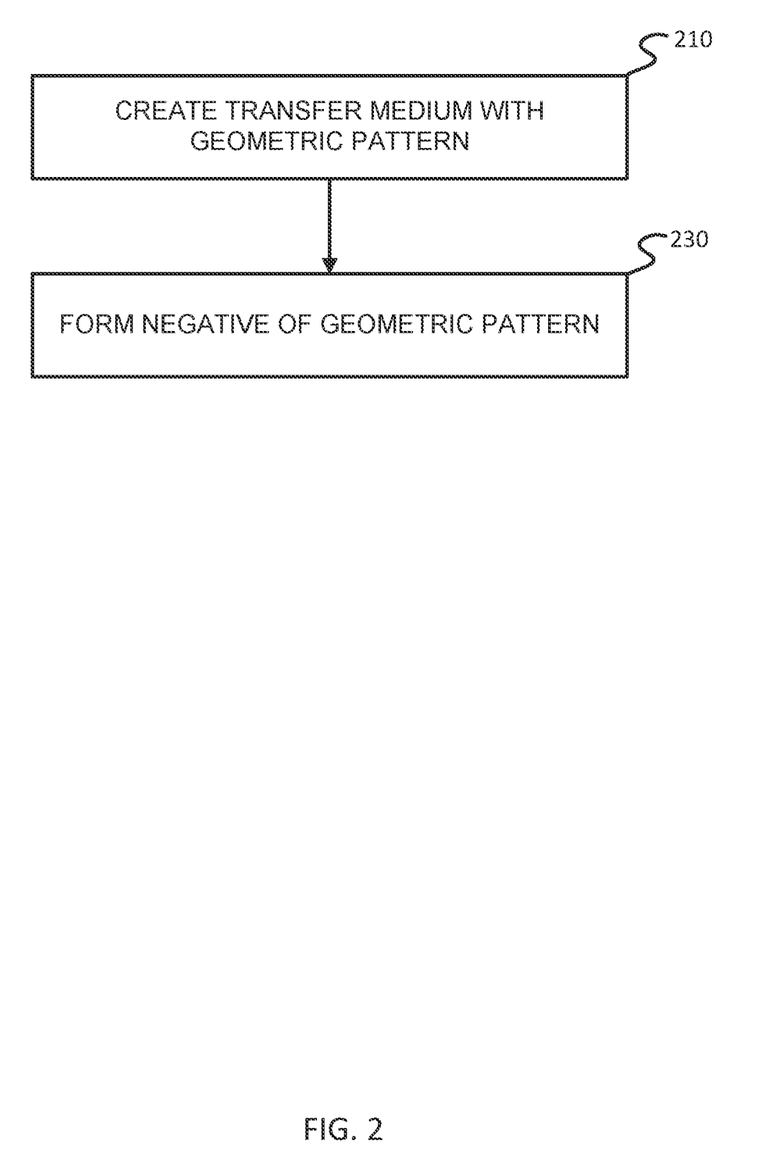
FIG. 2 is a flow chart diagram of an embodiment of forming a component with a transfer medium.
Figure 3:
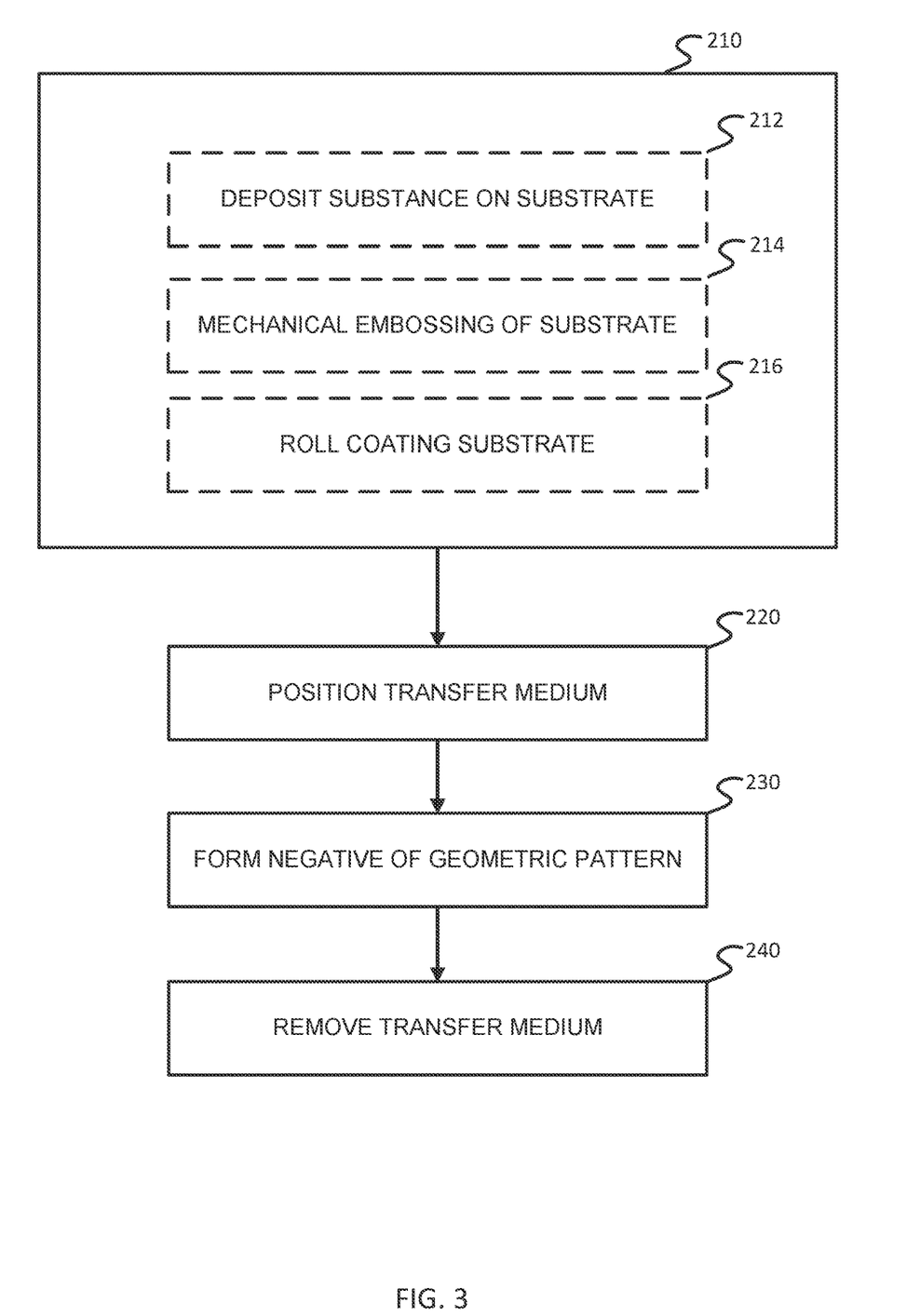
FIG. 3 is another flow chart diagram of an embodiment of forming a component with a transfer medium.
Figure 4:
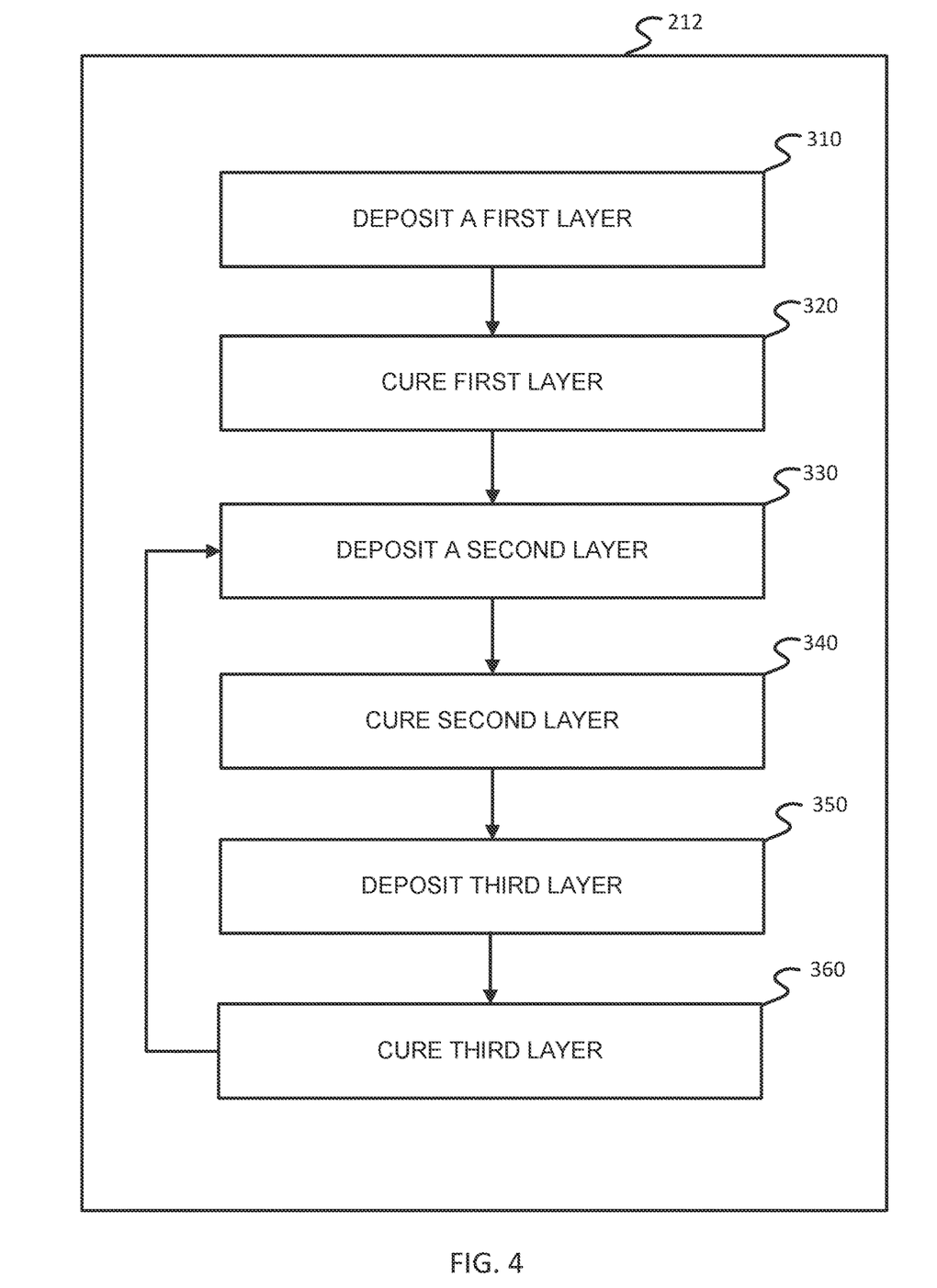
FIG. 4 is a flow chart diagram of an embodiment of depositing a substance on a substrate to create a transfer medium.

FIGS. 2 and 3 are flow chart diagrams of methods for forming surface features in a component of a bicycle using a transfer medium. FIG. 4 is a flow chart diagram for an embodiment for a method of creating a transfer medium. Additional, different, or fewer acts may be provided for the methods described herein. For example, the act of removing the transfer medium (act 240) may not be provided. The acts are performed in the order shown or other orders. The acts may also be repeated. For example, the acts of depositing a layer (act 330, act 350) and curing the layer (act 340, act 360) may be repeated. Example embodiments are described herein, however alternate embodiments may fall under the scope of the invention. For example, creating a transfer medium (act 210) may be accomplished using different techniques. For example, the transfer medium may be created through a deposition of a substance on a substrate (act 212), mechanical embossing of a substrate (act 214), roll coating a substrate (act 216), as well as other techniques not described herein.

In act 210 a transfer medium with a geometric pattern is created. The transfer medium is formed with a substrate. The substrate may be flexible, such as a flexible sheet. For example, the substrate may be a fabric, a paper, or a thin film plastic. The transfer medium may include a release surface on one or more sides of the transfer medium to facilitate release of the transfer medium from a formed bicycle component. The release surface may be made of any material operable to enable such formed bicycle component release, such as materials with low surface energy that do not bond well with other materials. For example, polysiloxane, polyvinyl fluoride, silicon based materials, as well as other materials may be used. In an embodiment, the substrate of the transfer medium is a super-calendered kraft paper (e.g. cellulose paper) that has a side of the substrate coated in a polysiloxane release material. Paper for use as a substrate generally includes the use of wood pulp fibers in construction, but other fibers may also be used. For example, cotton, flax, hemp, sisal, other organic and man-made fibers, and combinations thereof, may be used The transfer medium may be created through the deposition of a substance on the substrate (act 212). In an embodiment, the substance is formed of a first material, the substrate is formed of a second material, and the first material is different than the second material. For example, the substance may be a curable resin or other curable material. The curable material may be cured through the application of heat, moisture, radiant energy, or other techniques. For example, the curable material (i.e. resin in this example) may be curable through the application of radiant energy in the form of ultraviolet ("UV") light, infrared ("IR") light, or electron beam radiation. These types of polymerized materials have been shown to have properties that withstand a prolonged exposure to elevated temperature and pressure that may be encountered in a carbon fiber reinforced plastic molding process.

The substance may be deposited on the substrate (act 212) to generate a depth or height of the substance above the substrate. As such, the substrate and substance are selected such that the substance will adhere to the substrate for the deposition. In an embodiment, the deposition of the substance is achieved through the use of jet material deposition techniques.

Figure 5:
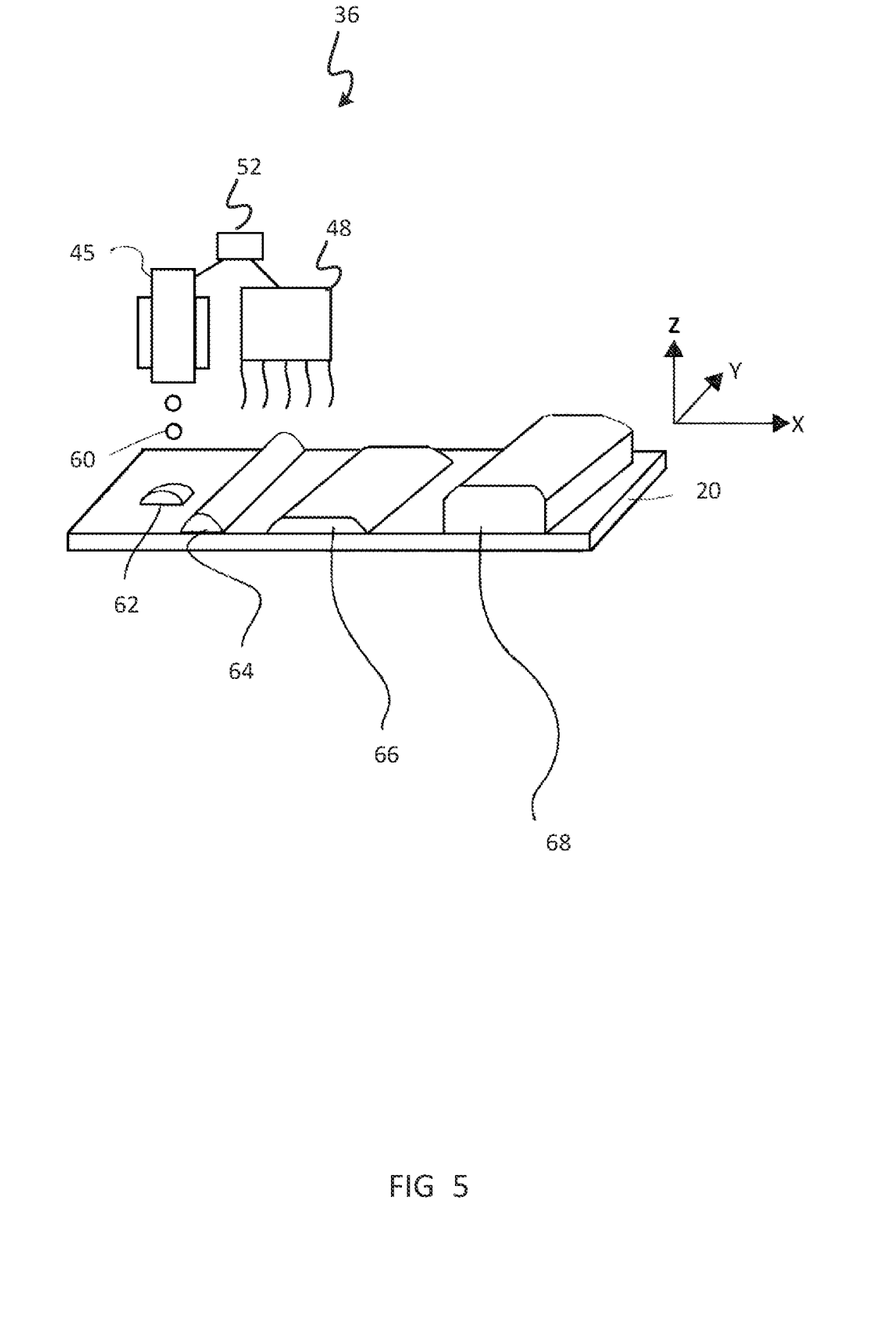
FIG. 5 is a schematic diagram for an apparatus that may be used to deposit a substance on a substrate to create a transfer medium.

Jet material or substance deposition techniques are derived from ink-jet printing processes, but may use ink-like substances as working fluids, such as acrylate resins, that may include color, but are not used specifically for the pigments and/or dyes contained in ink. As such, jet material deposition may or may not include a working fluid (i.e. substance to be deposited) that contains dyes and/or pigments. Jet material deposition can be performed using a system as illustrated by the diagram of FIG. 5. The system includes at least one jet printhead 45 which may be piezo-electromechanical devices. The jet printhead 45 deposits a predetermined volume of working fluid drops on-demand when triggered by an electrical impulse. The jet printhead 45 may be moved across a working area by a printing device which moves the jet printhead 45 along controlled X and Y coordinates over the working area in a back-and forth scanning motion. In one alternative, the jet printhead 45 moves along controlled X, Y and Z coordinates. In another alternative, the substrate 20 having the working material deposited is moved, while the jet printhead 45 is stationary. In a further embodiment both the substrate 20 having the working material deposited and the jet printhead 45 are moved, simultaneously or at different times throughout the deposition process.

The jet printhead 45 drops a series of very precise drop volumes of ink, in the range of 1-300 picoliters, onto the substrate 20 as typically driven by raster software, to deposit a collection of drops in one or more layers of organized structure. The deposition of working fluid constructs a geometric shape or swath which reflects or recreates an indicated geometric shape of the electronic image file.

The system 36 includes one or more energy sources 48, which may be light sources, disposed on or proximate to the printhead 45. In an embodiment, the light sources 48 are typically mercury-iron arc lamps with a spectral output of 350-450 nanometers to cure the deposited working material (e.g. resin). Other light sources such as, light emitting diodes ("LED"), may also be used. Shutter devices may also be provided as part of the system 36 and positioned to regulate each of the light sources 48.

The system 36 includes conventional control circuitry 52 to control mechanical and electrical components of the system and which also may convert the electronic image data file sent to the system into a form such that the system can deposit the working fluid to create the geometric shapes and/or patterns on the substrate 20. In use, the system 36 is typically electronically supplied with an "artwork" file, e.g., one or more digital images composed of shapes or other geometric patterns having a depth, which is converted or has been converted into a raster image composed of dots or pixels.

Once the resin is deposited onto the substrate 20 it is be cured, i.e., converted from a liquid state to a solid which bonds chemically to the target position on the substrate 20 and develops an adhesive and cohesive strength which provides a useful durability for the conditions experienced in use. In an embodiment, during operation the system 36 deposits a resin working fluid which may be a UV-curable material matrix. The resin can be mainly acrylic monomers with a curing (i.e., catalyzing or polymerizing) initiator component. After deposition, the resin is cured by exposure to strong UV-light from the light source 48. The advantage of UV-curable resin is that the resin is "dry" as soon as it is cured, thus, UV-curable resins can be applied to a wide range of substrates and result in a very robust cured resin structure. The resin is formulated to have a surface tension which is compatible with the substrate, which is considered a well-known skill in the art of jet material deposition working fluid formulation.

In this embodiment, the ink contains photo-initiators that absorb the UV energy from the light source 48. Upon exposure, a chemical reaction occurs that converts the liquid resin into a solid film or structure. The resin contains monomers that function as solvents because of their ability to reduce viscosity and combine with other resin components. Thus, the resin compositions may generally exist as 100% percent solids and do not release volatile organic compounds ("VOCs"). Monomers also add improved film hardness and resistance properties. The resin also contains oligomers that determine the final properties of the cured resin film or structure, including its elasticity, hardness, environmental performance characteristics, and chemical resistance.

In curing, the resin is exposed to UV radiation whereupon a chemical reaction takes place. The photo-initiators cause the resin components to cross-link into a solid. Typically a shuttered mercury-vapor lamp 48 is positioned on either side of the printhead, and produces a great amount of heat, although the heat is not considered a mechanism in this curing process. A shuttered mercury-vapor lamp 48 is used for free radical UV curable resin. UV cured resins do not evaporate, but rather cure or set as a result from this chemical reaction. No material is evaporated or removed, which means nearly all or all of the delivered volume may be used to provide structure for geometric patterns. The UV curing reaction happens very quickly, which leads to nearly instant drying and results in a completely cured structure in a matter of seconds. This enables a fast substance deposition process. As a result of this nearly instant chemical reaction no solvents penetrate the substrate once it resin is deposited thereupon, which allows for structural integrity of the substrate 20.

Depending upon where each resin deposition is positioned in relation to other depositions, the resin can take on a variety of forms on the substrate, and can take be arranged as a geometric shape or collection of shapes. For example, a single dot or point 62 of resin 60 will form a discrete dot or point of resin. If multiple dots of resin 60 are deposited in an interconnected line or series of closely spaced dots, the resin forms a discrete line 64. If multiple lines of resin 60 are deposited in parallel and sufficiently close to coalesce, a two-dimensional layer or band 66 is formed. The width of the band 66 along the substrate is dependent upon how many lines are deposited. Resin is used as the working fluid in this example, but other fluids that have a similar behavior when deposited and/or cured may be used as well.

In an embodiment, jet deposition techniques may be used to achieve substance depth as indicated by FIG. 4. In act 310 a first layer of the substance is deposited. In act 320 the first layer of the substance is cured. In act 330 a second layer of the substance is deposited onto the cured first layer. In act 340 the second layer of the substance is cured. In act 350 a third layer may be deposited onto the cured second layer. In act 360 the third layer may be cured. The depositing and the curing of layers may be repeated to achieve an established depth of the material from the substrate surface. The depth may be established such that the depth may provide adequate formation of surface features in a formed bicycle component. For example, in an embodiment it has been shown that whereas a single deposited layer of a substance such as a UV-curable acrylate resin is about 0.00125 millimeters, an effective depth of such material on a transfer medium involves repetitively forming layers of the substance such that a depth of at least 0.025 millimeters is achieved.

The method of FIG. 4 is explained further with additional reference to FIG. 5. If resin is layered vertically 60, a three-dimensional ("3D") geometric shape and/or pattern 68 can be formed. In this manner, the jet deposition system 36 can be used to convert a smooth and/or flat substrate into transfer medium created by jet material deposition. The complexity and size of the geometric patterns 68 are only limited by the ability of the jet deposition system 36 to accurately deposit resin.

Figure 8:
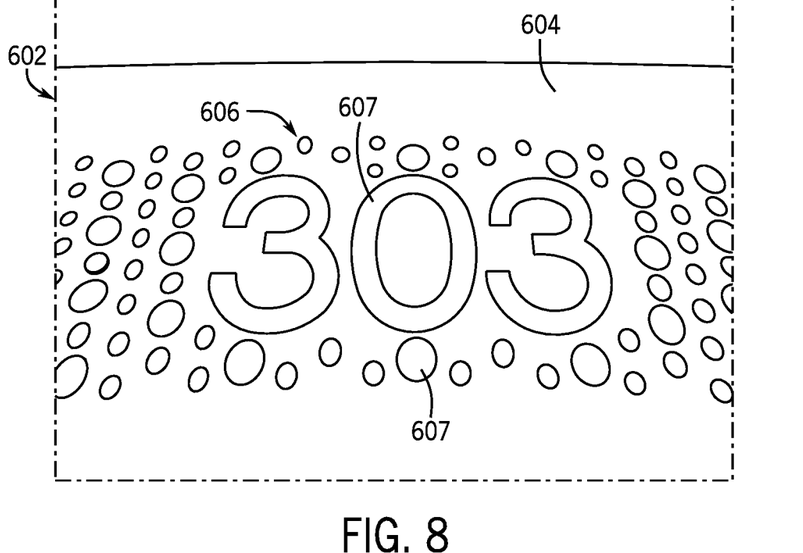
FIG. 8 illustrates is an example of transfer media having material forming a geometric pattern.

Resin is used as the working fluid in examples provided herein, but other fluids that have a similar behavior when deposited and/or cured may be used as well. An example of a transfer medium 602 can be seen in FIG. 8 that has a substance 607 deposited on the substrate to form a geometric pattern 606. The shown geometric pattern 606 has a depth dimension that provides a negative space to form surface features in a bicycle component reflective of the negative of the geometric pattern 606

Figure 6A:
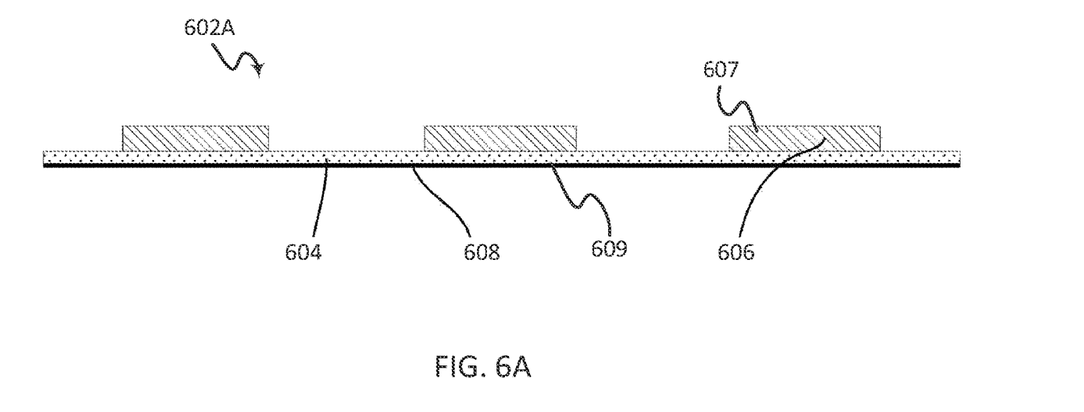
FIGS. 6A-6C illustrate embodiments of transfer media.
Figure 6B:
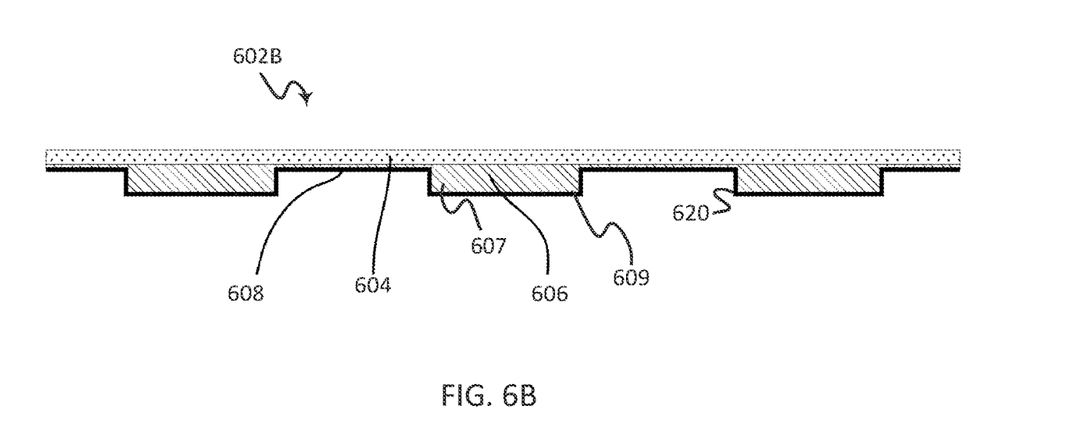
Figure 6C:
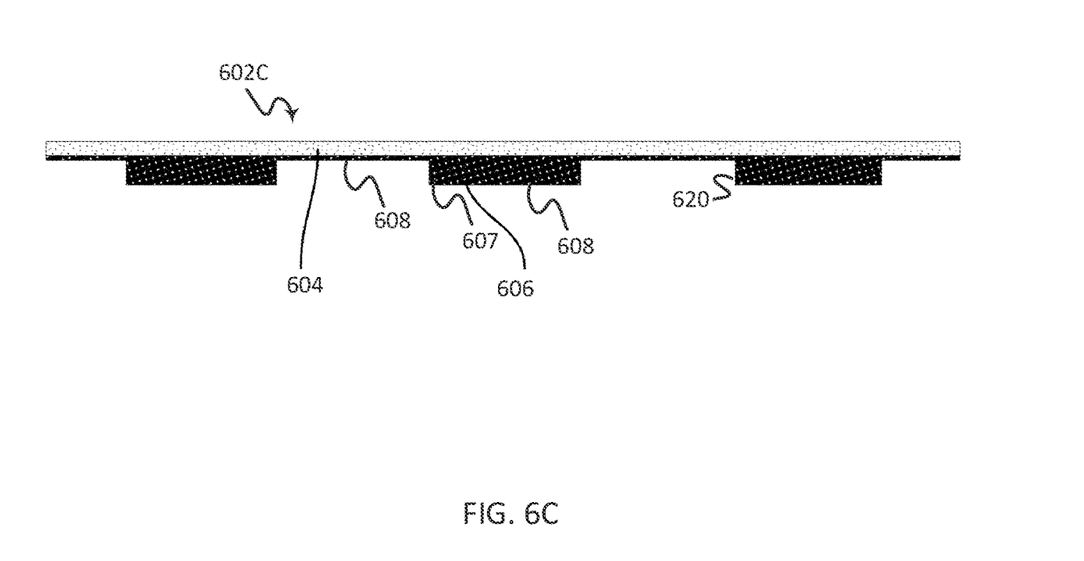

FIGS. 6A-6C show different embodiments of transfer media which may be created through by depositing a substance 607, such as a resin, onto a substrate to form depth dimensioned geometric patterns 606 on a substrate. Each of the transfer media 602A, 602B, 602C include at least two materials, the substrate 604 and a material 607 forming the geometric pattern 606, which in the provided examples is a curable resin. The transfer media 602A, 602B, 602C may also include a release surface 608. The release surface 608 involves the use of a material that has a low surface energy to facilitate release of the transfer media from the formed part after the forming process. The release surface 608 may be formed of a separate layer 609 of a release material, such as a polysiloxane based material. Thus, the transfer medium 602A, 602B, may be formed of three materials. The release surface 608 may also be a surface of one of the other materials of the transfer medium 602C. For example, the geometric pattern 606 may be formed from a material such as a cured silicone type resin, thus providing a release surface directly on the geometric pattern material 607. In this embodiment, it may be necessary to deposit additional material between the depths provided for the geometric patterns, thus facilitating a contiguous release surface to separate the substrate from the unformed and/or formed bicycle component during and/or after the forming process.

Figure 7A:
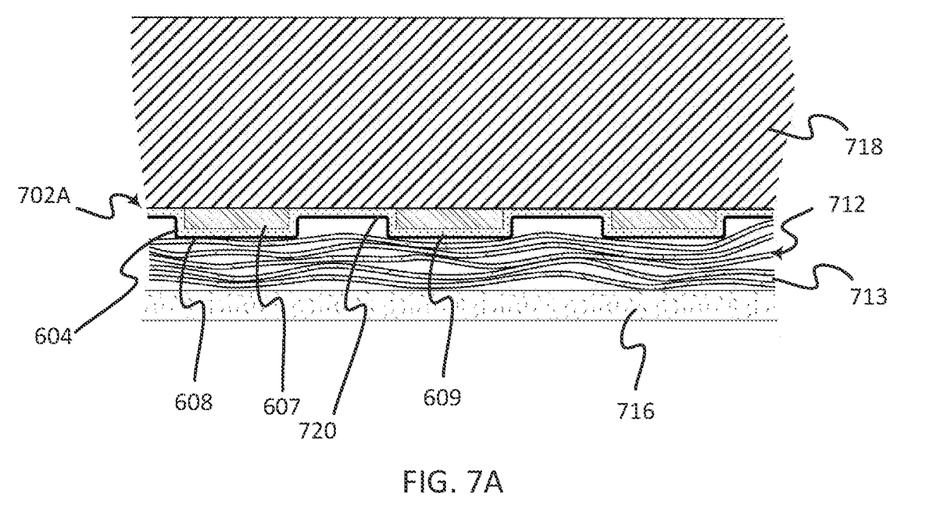
FIGS. 7A-7C illustrate an embodiment of forming surface features in a component with transfer media.
Figure 7B:
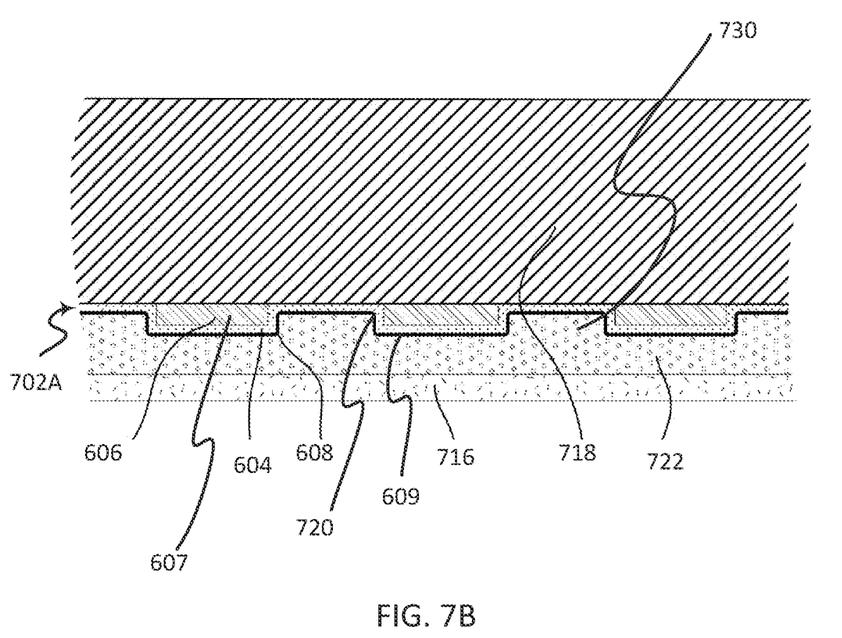
Figure 7C:
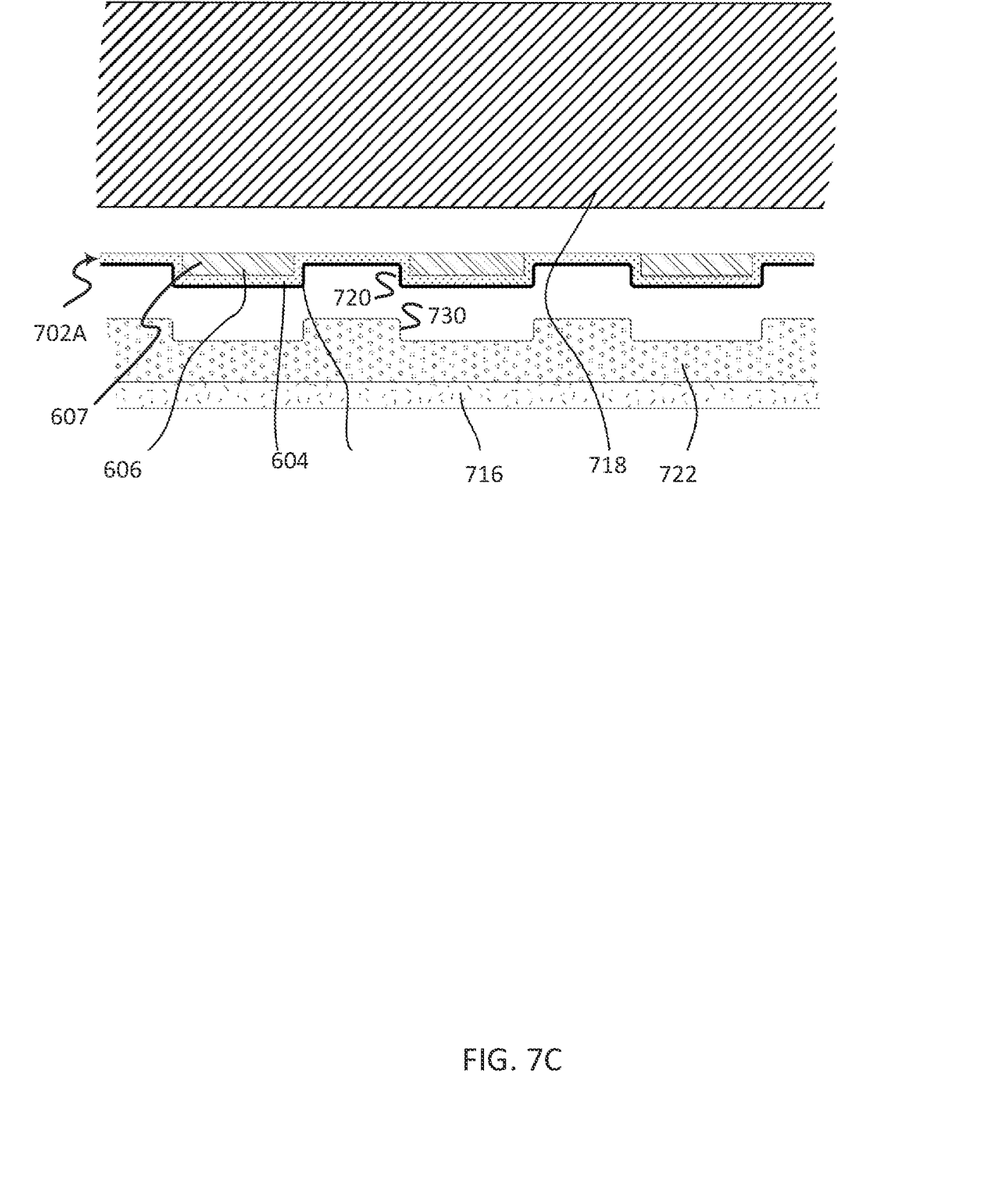

The transfer media 602A in FIG. 6A is formed through the deposition of material 607, such as through a jet material deposition process, on a first side of a substrate 604. The release material layer 609 is formed on an opposing and/or second side of the substrate 604. The release material layer may be formed prior to, during, or after the deposition of the material 607 on the substrate 604. In this embodiment, the material 607 of the geometric pattern 606 may be pressed through the substrate 608 before or during the bicycle component forming process, thus deforming the substrate 604. This configuration will still provide the release surface 608 as a barrier between the substrate 604 and a formed or unformed bicycle component. The resulting transfer media 702A is illustrated in FIGS. 7A-7C. In this embodiment, the formed part will include surface features 730 that take the shape of the negative space 720 created adjacent the release surface 608 and between the geometric pattern 606 materials. The negative space 720 is reflective of the geometric pattern 606.

The transfer media 602B shown in FIG. 6B is formed through the deposition of material 607, such as through a jet material deposition process, on a first side of a substrate 604. A release layer 608 is applied over the geometric pattern material 607 and the substrate 604. Negative space 620 reflecting the negative of the geometric pattern 606 is thus formed without further manipulation of the construction of the transfer media 602B.

The transfer media 602B shown in FIG. 6B is formed through the deposition of material 607, such as through a jet material deposition process, on a first side of a substrate 604. In this embodiment, the deposited material 607 forms the release layer 608 and creates the negative space 620 used to form surface features in a formed bicycle component.

As is indicated in FIG. 2, other techniques may also be used to create the transfer medium. For example, the transfer medium may be created through mechanical embossing of a substrate (act 214). The mechanical embossing may be achieved with a punch or rolling die having a geometric pattern that is imparted to the substrate through deformation of the substrate. The vacancies left by the embossing on the substrate may be filled with a hard and/or curable substance, such as resin, thereby providing the solid structure of the transfer medium.

The transfer medium may also be created through roll coating of a substrate (act 216). For example, a substrate coated with a high viscosity resin may be subjected to mechanical deformation through the application of a mechanical die or roller having a geometric pattern. The high viscosity resin may then be cured to solidify the imparted geometric pattern in the transfer media.

In act 220 the transfer medium is positioned. The transfer medium may be positioned relative to unformed materials of the bicycle component and/or a piece of an apparatus used in the creation of the bicycle component, such as a mold. The transfer medium may be positioned so as to be in contact with unformed materials of the bicycle component and/or the apparatus. In an embodiment that includes a transfer medium having release material applied to one or both sides of the transfer medium, the transfer medium is positioned such that the release material of the transfer medium is in contact with the unformed bicycle component.

In an embodiment, the unformed materials may include uncured materials. For example, the uncured materials may be cured through the application of heat and/or pressure.

In act 230 a negative of the geometric pattern of the transfer medium is formed. The negative is formed in a surface of the bicycle component. The negative forms a surface feature having different depth or depths relative to an outer surface of the bicycle component.

In an embodiment, the bicycle component is formed of carbon fiber reinforced plastic ("CFRP"), for example as illustrated in FIGS. 7A-7C. In this embodiment, the transfer medium 702A may be created through the deposition of the substance on the substrate (act 212). The substance is partially or fully cured prior to forming the negative of the geometric pattern (act 230). For example, the substance may be a resin curable through the application of UV light, and the resin is cured prior to the application of the heat and/or pressure to the unformed carbon fiber materials (e.g. sheets of carbon fiber contained in an epoxy resin 713). Further, as indicated in this example, the deposited material and the uncured materials of the unformed bicycle component may be cured using different techniques (e.g. UV radiation for the substance and the application of heat and pressure for the uncured materials of the unformed bicycle component).

FIGS. 7A-7C illustrate an embodiment of forming of a negative of the geometric pattern. A transfer media 702A having a substance that forms a geometric pattern 606 is placed in between an unformed bicycle component 712, which in this example are sheets of carbon fiber contained in an epoxy resin, and a mold part 718. The unformed component 712 makes contact with a base part 716, which is a material intended to resist the pressure applied by the mold part 718 such that the unformed part 712 and the transfer medium 702A are subjected to the pressure applied by the molding process. In an embodiment, the base part 716 may be an additional mold part. In another embodiment the base part 716 may be reinforcement structure, such as an inflatable bladder, that is used in hollow CFRP component molding.

Figure 9:
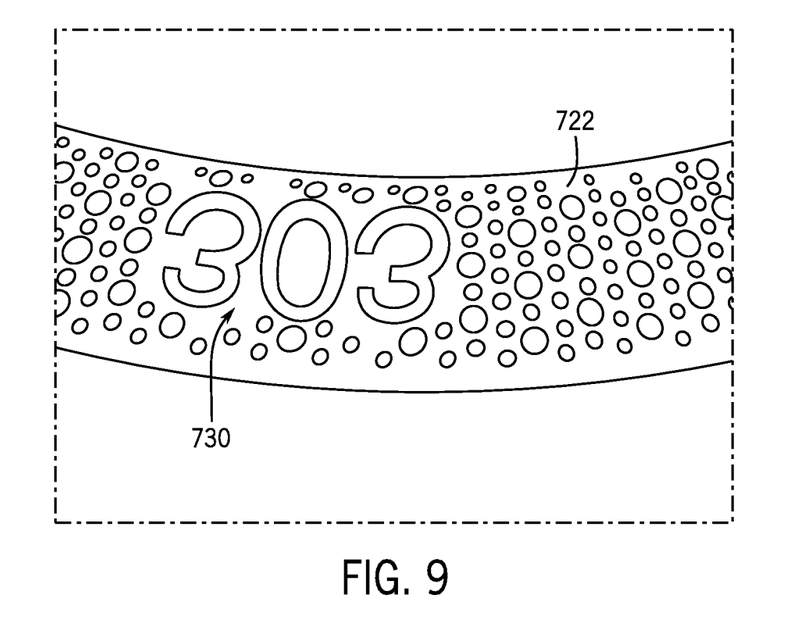
FIG. 9 illustrates an example of a formed component having surface features created with the use of the transfer media of FIG. 8.

During the molding process, the uncured materials 713 of the unformed component 712 and the transfer medium 702A are subjected to the application of heat and/or pressure. Pressure and/or heat inside the mold develop to push the substrate against the wall of the mold cavity, resulting in the extension of the material 607 of the geometric pattern 606 into the substrate resulting in feature shapes defined through the substrate, and ultimately onto the surface of the finished (e.g. molded) formed component. In the current example, the CFRP sheets 713 are subjected to heat and pressure. The heat transforms the epoxy resin of the CFRP sheets to form a fluid and the pressure forces the fluid into the negative space 720 or to otherwise conform to the geometric pattern of the transfer medium, as can be seen in FIG. 7B. Maintaining the pressure while cooling the CFRP material causes the epoxy resin to cure leaving the residual surface feature in the formed component 722. The surface feature will be reflective of the geometric pattern 606 of the transfer medium, for example by the inclusion a void space in the surface of the component that represents the geometric pattern, by including a protrusion on the surface that represents the geometric pattern, or combinations thereof. FIG. 9 shows a formed component 722 (e.g. a bicycle wheel rim) having surface features 730 (e.g. "303" and other circular depressions) formed as the negative of the geometric pattern 606 created by the material 607 deposited on the substrate 604 of the transfer medium 602 of FIG. 8.

FIG. 7C illustrates the opening of the mold 718 to reveal the formed component 722 having the surface features 730.

In an embodiment, the forming the negative comprises pressing the substance into the substrate to cause a deformation of the substrate. This deformation may be caused before or during the forming of a surface feature on a surface of a bicycle component using the transfer medium.

In act 240 the transfer medium is removed. The transfer medium is removed from the bicycle component and/or the apparatus used in the creation of the bicycle component, for example a part of a mold as illustrated in FIG. 7C. The transfer medium may be removed using different techniques.

Figure 10:
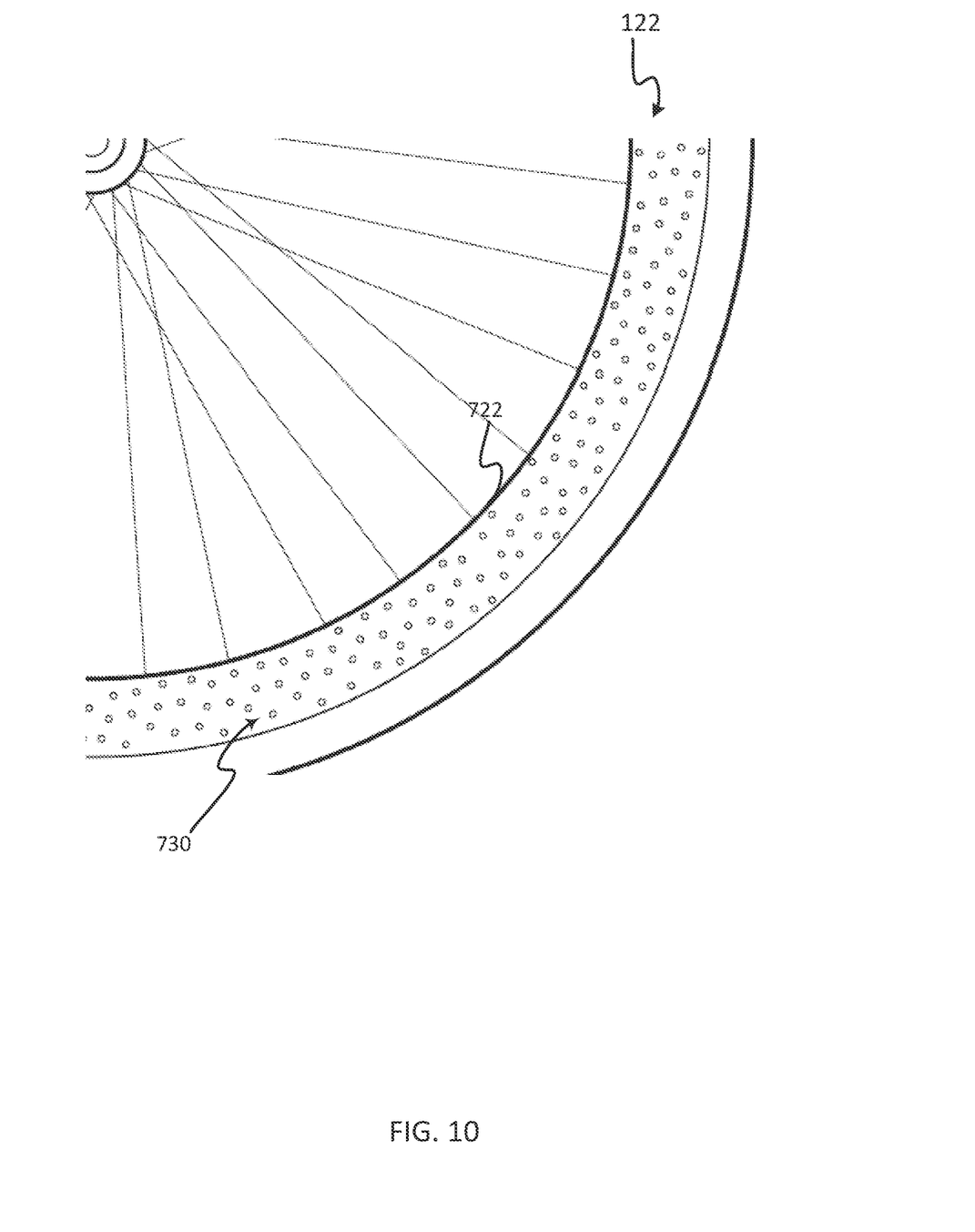
FIG. 10 illustrates an example of a bicycle wheel having a surface feature created with the use of transfer media.
Figure 11:
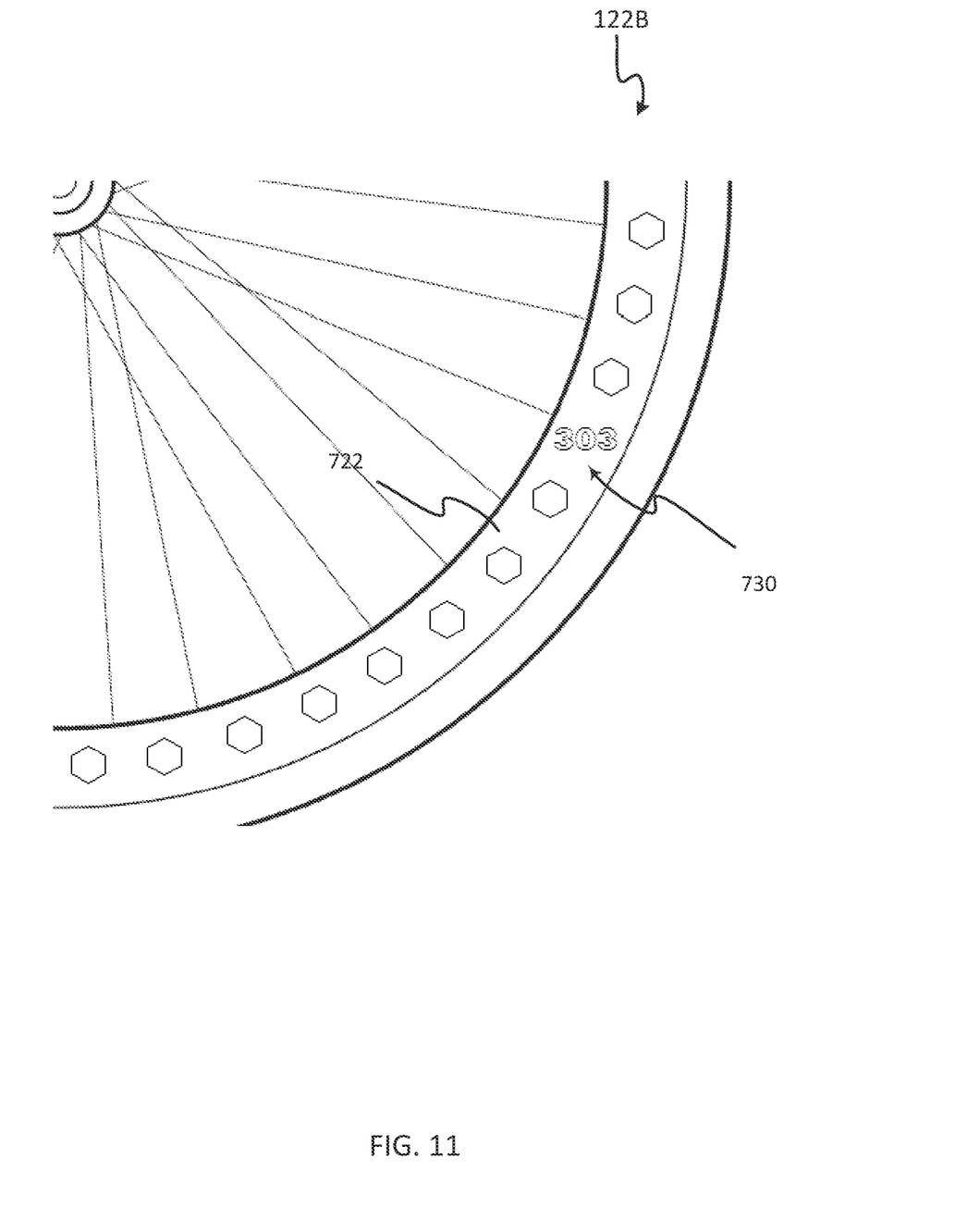
FIG. 11 illustrates another example of a bicycle wheel having a surface feature created with the use of transfer media.

FIG. 10 shows a bicycle wheel 122 having a formed rim 722 that includes a surface feature 730 including depressions or dimples formed through the application of a transfer medium as described herein. Other surface features may be formed in bicycle components as well, based on the geometric pattern used in the transfer medium. FIG. 11, for example, illustrates a bicycle wheel 122B having a formed rim 722 having a surface feature 730 that includes hexagonal depressions and characters forming a "303" depression. The complexity and composition of the surface feature is merely limited by the geometric pattern of the transfer medium. Any combination of shapes and structures may be generated, including characters and/or numerals in isolation or in combination with other shapes. Further, multiple depths may of the surface features may be achieved through varying the number and/or depth of the layers for portions of the geometric pattern of the transfer medium. For example, a geometric pattern may include dimples of varying depths, thus resulting in a surface feature having various depths on the surface of a formed component.

Figure 12:
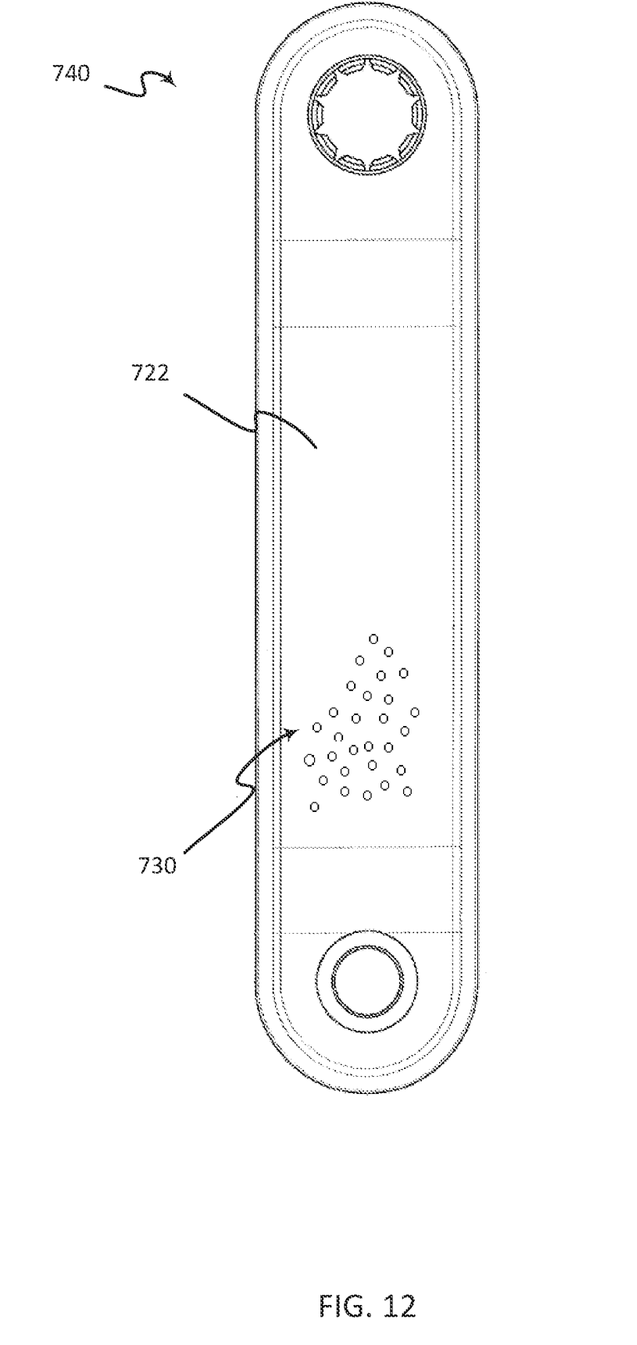
FIG. 12 illustrates an example crank arm bicycle component having a surface feature created with the use of transfer media.

Other bicycle components may also have surface features formed therein through the application of a transfer medium. FIG. 12, for example, illustrates a bicycle crank arm 740, for example as may be used with the drivetrain 130 illustrated in FIG. 1, having a formed surface 722 having surface feature 730 including depressions or dimples formed through the application of a transfer medium as described herein.

In an embodiment, a bicycle component, such as a bicycle wheel, crank arm, frame, or other component, includes a surface having surface features created by the application of a transfer medium before, during, and/or after the forming of the surface. The surface features may be created by a method involving the depositing of a substance onto a substrate in a geometric pattern to form the transfer medium. The method also involves positioning the transfer medium relative to the unformed surface of the bicycle component, and forming a negative of the geometric pattern in the surface of the bicycle component through the application of heat and/or pressure to the transfer medium and the unformed bicycle component.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. For example, the methods and techniques described herein are explained with reference to bicycle components, however, it is understood that the intended scope of the application may include non-bicycle components as well.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A transfer medium for use in molding of carbon fiber reinforced plastic ("CFRP") bicycle components, the transfer medium comprising:
   a substrate formed of a flexible material, the substrate having a first side and a second side;
   a geometric pattern formed of a hard material located on the first side of the substrate, the hard material different than the flexible material; and
   a release surface located on the second side of the substrate.

2. The transfer medium of claim 1, further comprising:
   the release surface formed of a release material having a low surface energy causing poor adhesion to the CFRP materials of the bicycle component.

3. The transfer medium of claim 2, wherein the release material is different than the hard material.

4. The transfer medium of claim 2, wherein the release material is in contact with the flexible material of the substrate and separated from the geometric pattern.

5. The transfer medium of claim 1, wherein the geometric pattern is composed of dots or pixels.

6. The transfer medium of claim 5, wherein the geometric pattern includes negative space.

7. The transfer medium of claim 5, wherein the geometric pattern includes characters or numerals.

8. The transfer medium of claim 5, wherein the geometric pattern has varying depths.

9. The transfer medium of claim 5, wherein the geometric pattern is a raster image.

10. The transfer medium of claim 1, wherein the geometric pattern is formed through jet deposition techniques.

11. The transfer medium of claim 1, wherein the geometric pattern is pressed into the substrate to cause a deformation of the substrate.

* * * * *